(12) United States Patent
Yokoyama et al.

(10) Patent No.: US 11,549,521 B2
(45) Date of Patent: Jan. 10, 2023

(54) CENTRIFUGAL COMPRESSOR

(71) Applicant: IHI Corporation, Tokyo (JP)

(72) Inventors: Yusei Yokoyama, Tokyo (JP); Takashi Fujiwara, Tokyo (JP); Wataru Ueda, Tokyo (JP); Hiroshi Saito, Tokyo (JP)

(73) Assignee: IHI Corporation, Tokyo (JP)

( * ) Notice: Subject to any disclaimer, the term of this patent is extended or adjusted under 35 U.S.C. 154(b) by 155 days.

(21) Appl. No.: 17/080,981

(22) Filed: Oct. 27, 2020

(65) Prior Publication Data

US 2021/0040959 A1 Feb. 11, 2021

Related U.S. Application Data

(63) Continuation of application No. PCT/JP2019/016227, filed on Apr. 15, 2019.

(30) Foreign Application Priority Data

May 14, 2018 (JP) .............................. JP2018-092831

(51) Int. Cl.
*F04D 29/46* (2006.01)
*F02B 37/02* (2006.01)
(Continued)

(52) U.S. Cl.
CPC .............. *F04D 29/46* (2013.01); *F02B 37/02* (2013.01); *F02B 39/10* (2013.01);
(Continued)

(58) Field of Classification Search
CPC ..... F04D 29/46; F04D 29/464; F04D 27/0246
See application file for complete search history.

(56) References Cited

U.S. PATENT DOCUMENTS 7,481,415 B2 * 1/2009 Reinicke ............... H01F 7/1615
251/129.1
2014/0093354 A1 4/2014 Sekularac et al.
(Continued)

FOREIGN PATENT DOCUMENTS

CN 104428539 A 3/2015
CN 104968944 A 10/2015
(Continued)

OTHER PUBLICATIONS

Japanese Office Action dated Jun. 15, 2021 in Japanese Patent Application No. 2020-519524, 4 pages.
(Continued)

*Primary Examiner* — J. Todd Newton
*Assistant Examiner* — Brian O Peters
(74) *Attorney, Agent, or Firm* — Oblon, McClelland, Maier & Neustadt, L.L.P.

(57) ABSTRACT

Provided is a centrifugal compressor, including: a movable member which is movable between a first position and a second position, the first position being a position at which an opening degree of an auxiliary flow passage arranged more on an outer diameter side than a main flow passage becomes a first opening degree, the second position being a position at which an opening degree of the auxiliary flow passage becomes a second opening degree smaller than the first opening degree; and a linear actuator configured to drive the movable member in a rotation axis direction of the impeller.

4 Claims, 3 Drawing Sheets

(51) Int. Cl.
    *F02B 39/10*   (2006.01)
    *F04D 29/66*   (2006.01)
    *F04D 27/02*   (2006.01)
    *F04D 29/42*   (2006.01)
    *F04D 17/10*   (2006.01)

(52) U.S. Cl.
    CPC ....... *F04D 27/0246* (2013.01); *F04D 29/464* (2013.01); *F04D 29/667* (2013.01); *F04D 17/10* (2013.01); *F04D 29/4213* (2013.01)

(56) References Cited

U.S. PATENT DOCUMENTS

| | | | |
|---|---|---|---|
| 2014/0308110 | A1 | 10/2014 | Houst et al. |
| 2015/0192133 | A1 | 7/2015 | An et al. |

FOREIGN PATENT DOCUMENTS

| | | | |
|---|---|---|---|
| CN | 105358837 | A | 2/2016 |
| CN | 106661957 | A | 5/2017 |
| DE | 10 2013 020 656 | A1 | 7/2014 |
| JP | 2-66382 | A | 3/1990 |
| JP | 2003-106293 | A | 4/2003 |
| JP | 2005-273846 | A | 10/2005 |
| JP | 2006-002650 | A | 1/2006 |
| JP | 2010-071140 | A | 4/2010 |
| JP | 2012-177311 | A | 9/2012 |
| JP | 5824821 | B2 | 12/2015 |
| JP | 2016-136033 | A | 7/2016 |
| JP | 2016-173051 | A | 9/2016 |
| WO | WO-2008157109 | A2 * | 12/2008 ........... F01D 17/105 |
| WO | WO 2014/033878 | A1 | 3/2014 |

OTHER PUBLICATIONS

Combined Chinese Office Action and Search Report dated Mar. 16, 2022 in corresponding Chinese Patent Application No. 201980028998.7 (with English Translation of Category of Cited Documents), 7 pages.

Combined Chinese Office Action and Search Report dated Aug. 2, 2021 in corresponding Chinese Patent Application No. 201980028998.7 (with English Translation of Category of Cited Documents), 7 pages.

International Search Report dated Jul. 9, 2019 in PCT/JP2019/016227 filed on Apr. 15, 2019 (with English Machine Translation), 2 pages.

\* cited by examiner

CENTRIFUGAL COMPRESSOR

CROSS REFERENCE TO RELATED APPLICATIONS

This application is a continuation application of International Application No. PCT/JP2019/016227, filed on Apr. 15, 2019, which claims priority to Japanese Patent Application No. 2018-092831, filed on May 14, 2018, the entire contents of which are incorporated by reference herein.

BACKGROUND ART

Technical Field

The present disclosure relates to a centrifugal compressor.

Related Art

A centrifugal compressor includes a compressor impeller and a compressor housing. A compressor housing of Patent Literature 1 includes a wall portion configured to partition a flow passage on an upstream side of a compressor impeller into a main flow passage and an auxiliary flow passage. The compressor housing of Patent Literature 1 includes an opening/closing mechanism configured to open and close the auxiliary flow passage.

CITATION LIST

Patent Literature

Patent Literature 1: JP 5824821 B2

SUMMARY

Technical Problem

However, the structure of the opening/closing mechanism of Patent Literature 1 is complicated. Thus, there has been a demand for a centrifugal compressor capable of opening and closing an auxiliary flow passage with a simple configuration.

The present disclosure has an object to provide a centrifugal compressor capable of opening and closing an auxiliary flow passage with a simple configuration.

Solution to Problem

In order to solve the above-mentioned problem, according to one mode of the present disclosure, there is provided a centrifugal compressor, including: an impeller; a main flow passage formed on a front surface side of the impeller; a movable member which is movable between a first position and a second position, the first position being a position at which an opening degree of an auxiliary flow passage arranged more on an outer diameter side than the main flow passage becomes a first opening degree, the second position being a position at which an opening degree of the auxiliary flow passage becomes a second opening degree smaller than the first opening degree; and a linear actuator configured to drive the movable member in a rotation axis direction of the impeller.

The linear actuator may be a linear solenoid including a permanent magnet.

The centrifugal compressor may include: a link member including: a driven portion, which is provided more on one end side than a rotation axis, and is configured to be driven by the linear actuator; and a fitting portion, which is provided more on another end side than the rotation axis; an engagement member provided to the fitting portion; and an engagement portion, which is provided to the movable member, and with which the engagement member is to be engaged.

The centrifugal compressor may include a wall portion configured to define the main flow passage and the auxiliary flow passage, and the movable member may be a blocking plate, which is provided in the auxiliary flow passage, and is slidable in a rotation axis direction of the impeller along the wall portion.

Effects of Disclosure

According to the present disclosure, the auxiliary flow passage can be opened and closed with a simple configuration.

DESCRIPTION OF EMBODIMENTS

Figure 1:
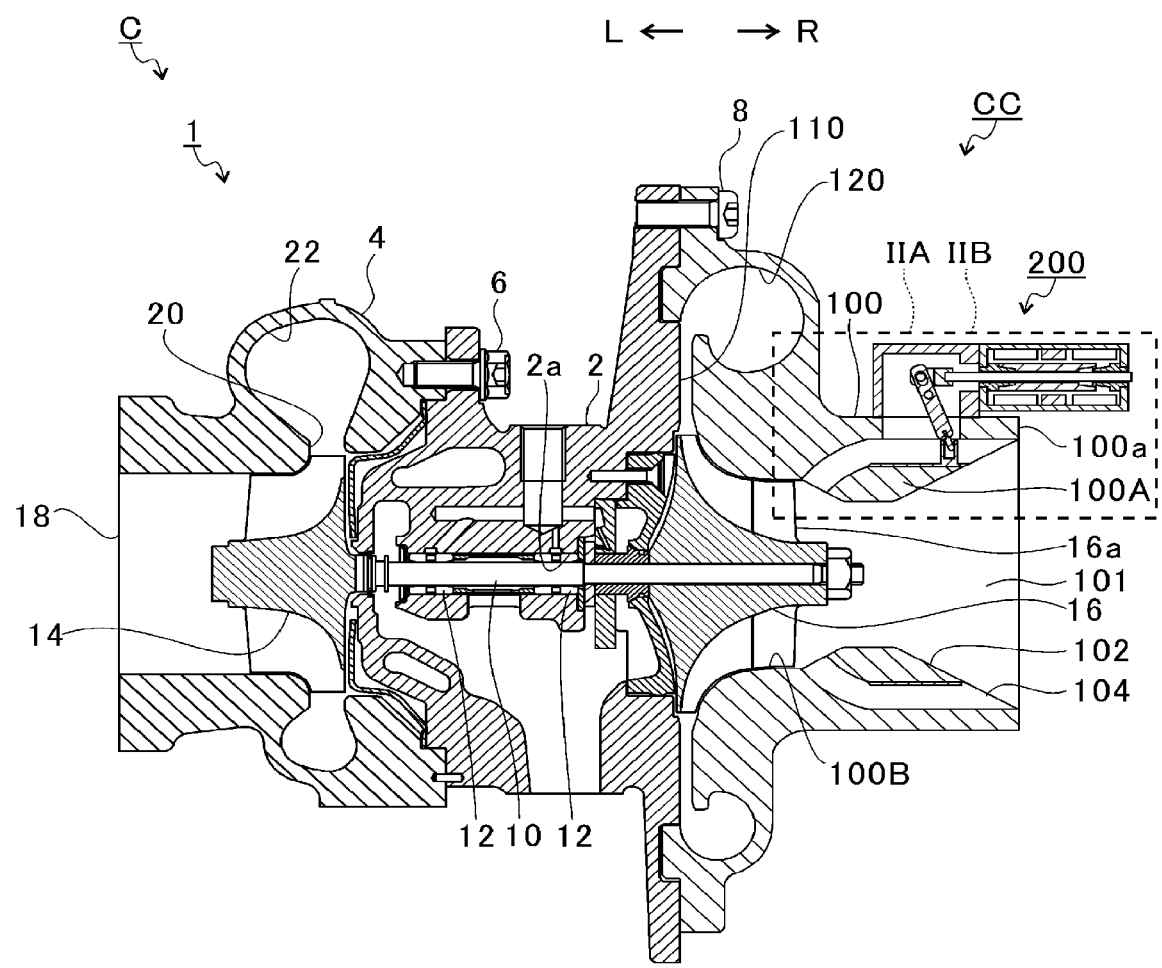
FIG. 1 is a schematic sectional view of a turbocharger.

Now, with reference to the attached drawings, an embodiment of the present disclosure is described in detail. The dimensions, materials, and other specific numerical values represented in the embodiment are merely examples used for facilitating the understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C, and the direction indicated by the arrow R illustrated in FIG. 1 corresponds to a right side of the turbocharger C.

As illustrated in FIG. 1, the turbocharger C includes a turbocharger main body 1. The turbocharger main body 1 includes a bearing housing 2, a turbine housing 4, and a compressor housing 100. The turbine housing 4 is coupled to the left side of the bearing housing 2 with a fastening bolt 6. The compressor housing 100 is coupled to the right side of the bearing housing 2 with a fastening bolt 8.

The bearing housing 2 has a bearing hole 2a. The bearing hole 2a passes through the turbocharger C in a right-and-left direction. The bearing hole 2a accommodates a part of a shaft 10. Bearings 12 are accommodated in the bearing hole 2a. In FIG. 1, full-floating bearings are illustrated as one example of the bearings 12. However, the bearings 12 may be other radial bearings such as semi-floating bearings or rolling bearings. The shaft 10 is axially supported by the bearings 12 so as to be freely rotatable. A turbine impeller 14 is provided at a left end portion of the shaft 10. The turbine impeller 14 is accommodated in the turbine housing 4 so as to be freely rotatable. A compressor impeller (impeller) 16 is provided at a right end portion of the shaft 10. The compressor impeller 16 is accommodated in the compressor housing 100 so as to be freely rotatable. A centrifugal compressor CC includes the compressor impeller 16 and the compressor housing 100.

The compressor housing 100 has an intake flow passage 101. The intake flow passage 101 is opened on the right side of the turbocharger C. The intake flow passage 101 extends in an extending direction of a rotation axis of the compressor impeller 16 (hereinafter simply referred to as "axial direction"). The intake flow passage 101 is connected to an air cleaner (not shown). The compressor impeller 16 is arranged in the intake flow passage 101.

A diffuser flow passage 110 is formed by opposed surfaces of the bearing housing 2 and the compressor housing 100. The diffuser flow passage 110 increases pressure of air. The diffuser flow passage 110 is annularly formed. The diffuser flow passage 110 communicates to the intake flow passage 101 through intermediation of the compressor impeller 16 on a radially inner side.

A compressor scroll flow passage 120 is provided to the compressor housing 100. The compressor scroll flow passage 120 has an annular shape. The compressor scroll flow passage 120 is positioned, for example, on the radially outer side of the shaft 10 with respect to the diffuser flow passage 110. The compressor scroll flow passage 120 communicates to a suction port of an engine (not shown) and to the diffuser flow passage 110. Rotation of the compressor impeller 16 causes air to be taken into the intake flow passage 101 (compressor housing 100). The air having been taken is pressurized and accelerated in a course of flowing through blades of the compressor impeller 16. The air having been pressurized and accelerated is increased in pressure in the diffuser flow passage 110 and the compressor scroll flow passage 120. The air having been increased in pressure is introduced to the suction port of an engine.

The turbine housing 4 has a discharge port 18. The discharge port 18 is opened on the left side of the turbocharger C. The discharge port 18 is connected to an exhaust gas purification device (not shown). Moreover, a communication passage 20 and a turbine scroll flow passage 22 are defined in the turbine housing 4. The turbine scroll flow passage 22 has an annular shape. The turbine scroll flow passage 22 is located, for example, on an outer side with respect to the communication passage 20 in a radial direction of the turbine impeller 14. The turbine scroll flow passage 22 communicates to a gas inflow port (not shown). Exhaust gas to be discharged from a discharge manifold (not shown) of the engine is introduced to the gas inflow port. The communication passage 20 allows the turbine scroll flow passage 22 and the discharge port 18 to communicate to each other. Thus, the exhaust gas having been introduced from the gas inflow port to the turbine scroll flow passage 22 is introduced to the discharge port 18 through the communication passage 20 and the turbine impeller 14. The exhaust gas having been introduced to the discharge port 18 causes the turbine impeller 14 to rotate in the course of flow.

A rotation force of the turbine impeller 14 is transmitted to the compressor impeller 16 via the shaft 10. The air is increased in pressure as described above by the rotation of the compressor impeller 16. In such a manner, the air is introduced to the suction port of the engine.

The compressor housing 100 includes a cylindrical portion 100a. A narrowing portion 100A having a cylindrical shape is arranged inside the cylindrical portion 100a. The narrowing portion 100A is mounted to the cylindrical portion 100a through intermediation of ribs (not shown). An outer peripheral surface of the narrowing portion 100A is separated apart from an inner peripheral surface of the cylindrical portion 100a on the radially inner side.

In this embodiment, the narrowing portion 100A is formed separately from the compressor housing 100. The narrowing portion 100A is mounted to the compressor housing 100. However, the narrowing portion 100A may be formed integrally with the compressor housing 100.

The intake flow passage 101 is formed inside the cylindrical portion 100a. The narrowing portion 100A causes the intake flow passage 101 to branch into a main flow passage 102 and an auxiliary flow passage (bypass flow passage) 104. The narrowing portion 100A serves as a wall portion configured to define the main flow passage 102 and the auxiliary flow passage 104. The main flow passage 102 is formed on an inner peripheral surface side of the narrowing portion 100A. The auxiliary flow passage 104 is formed between the inner peripheral surface of the cylindrical portion 100a and the outer peripheral surface of the narrowing portion 100A.

The compressor impeller 16 includes blades 16a. The narrowing portion 100A is arranged on an upstream side (front surface side) of the blades 16a of the compressor impeller 16. An accommodating portion 100B is formed in the compressor housing 100. The accommodating portion 100B is configured to accommodate the blades 16a of the compressor impeller 16. The accommodating portion 100B is arranged on a downstream side of the narrowing portion 100A.

The blades 16a of the compressor impeller 16 have an outer diameter which varies in the axial direction. The blades 16a of the compressor impeller 16 have an outer diameter which decreases from a side closer to the turbine impeller 14 (hereinafter simply referred to as "downstream side") toward a side farther from the turbine impeller 14 (hereinafter simply referred to as "upstream side"). The blades 16a of the compressor impeller 16 have the smallest outer diameter (minimum outer diameter) at an end portion (front edge) on the upstream side.

The accommodating portion 100B has a shape which is similar to an outer shape of the blades 16a of the compressor impeller 16. An inner diameter of the accommodating portion 100B varies in the axial direction. The inner diameter of the accommodating portion 100B decreases from the downstream side toward the upstream side. The accommodating portion 100B has the smallest inner diameter (minimum inner diameter) at the front edge of the blades 16a of the compressor impeller 16.

The narrowing portion 100A has an inner diameter smaller than the minimum inner diameter of the accommodating portion 100B. The narrowing portion 100A has an inner diameter smaller than the minimum outer diameter of the blades 16a of the compressor impeller 16. With this, under an operation condition of the turbocharger C (centrifugal compressor CC) on a small flow rate side, the narrowing portion 100A prevents the air on the downstream side of the compressor impeller 16 from reversely flowing toward the upstream side of the compressor impeller 16. As a result, the narrowing portion 100A is capable of increasing an operation region of the turbocharger C (centrifugal compressor CC) on the small flow rate side.

However, when the narrowing portion 100A is provided, a flow-passage sectional area of the main flow passage 102 is decreased by the narrowing portion 100A. When the flow-passage sectional area of the main flow passage 102 decreases, an operation region of the turbocharger C on a large flow rate side decreases. Under an operation condition of the turbocharger C on the large flow rate side, when the decrease amount of the flow-passage sectional area of the main flow passage 102 by the narrowing portion 100A can be reduced, the decrease amount of the operation region of the turbocharger C on the large flow rate side can be reduced. Thus, it is preferred that, under the operation condition of the turbocharger C on the large flow rate side, the flow-passage sectional area of the main flow passage 102 increase as compared to the flow-passage sectional area given under the operation condition of the turbocharger C on the small flow rate side.

Figure 2A:
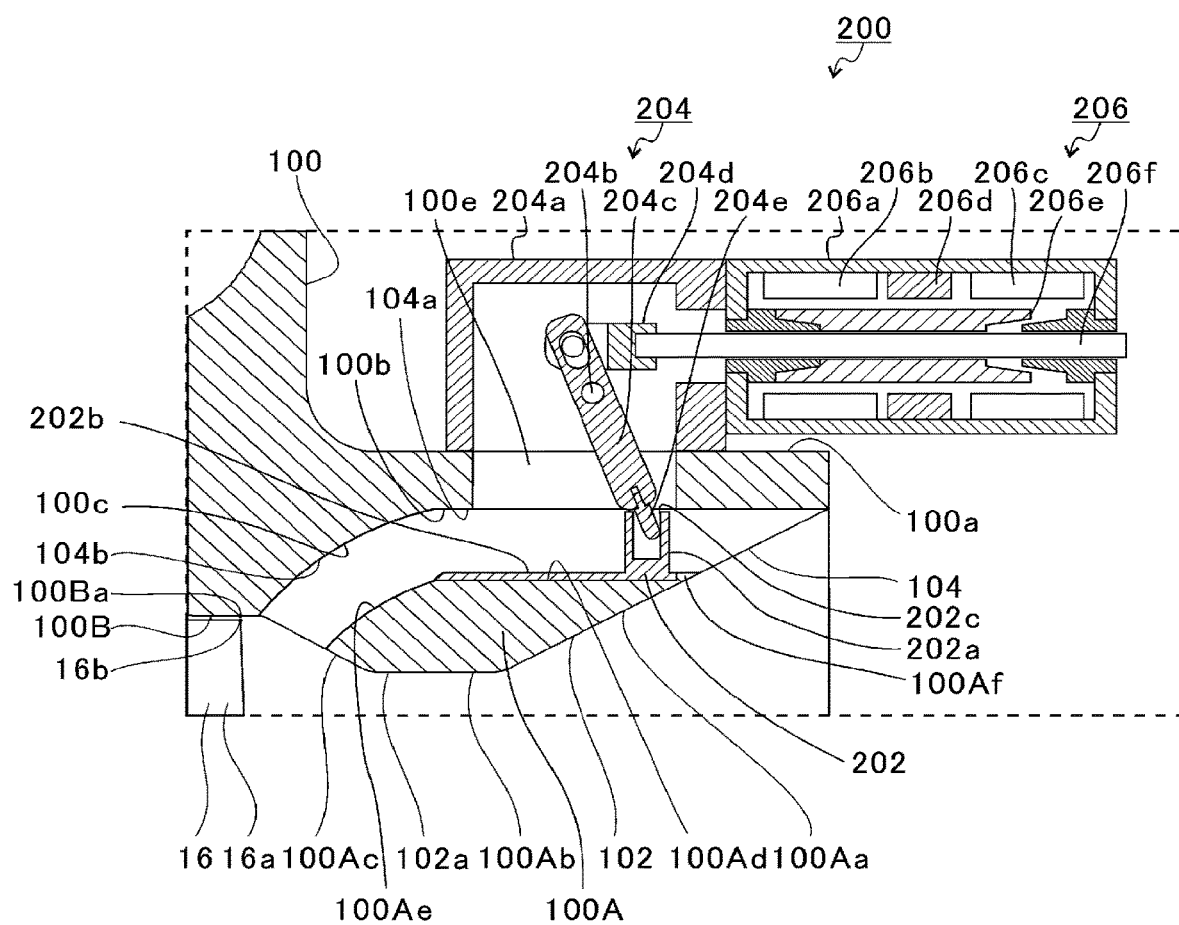
FIG. 2A is an illustration of a state in which a variable mechanism increases a flow-passage sectional area of an intake flow passage.
Figure 2B:
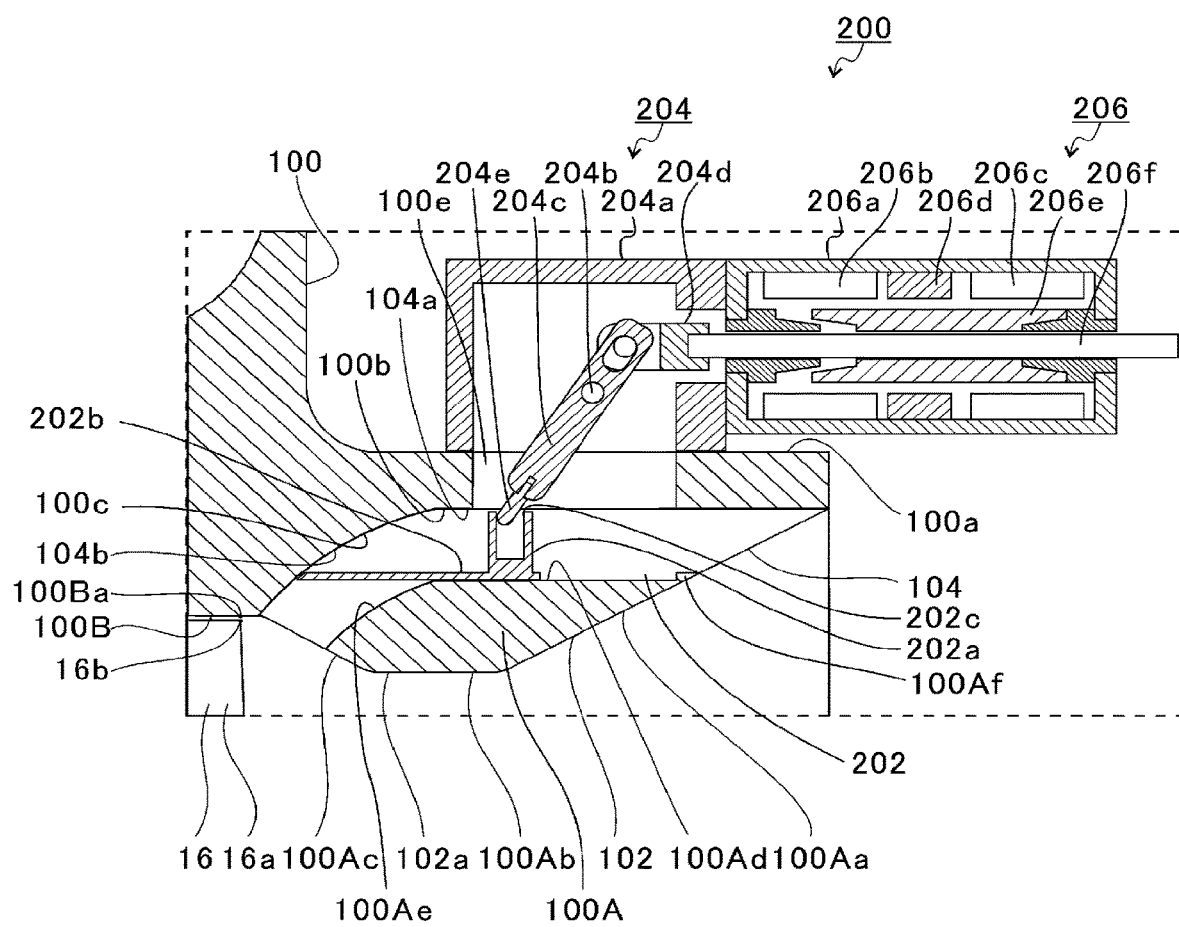
FIG. 2B is an illustration of a state in which the variable mechanism decreases the flow-passage sectional area of the intake flow passage.

In view of the above, the compressor housing 100 of this embodiment includes the auxiliary flow passage 104 and a variable mechanism 200. The variable mechanism 200 is configured to vary the flow-passage sectional area of the auxiliary flow passage 104 (intake flow passage 101). FIG. 2A is an illustration of a state in which the variable mechanism 200 increases the flow-passage sectional area of the intake flow passage 101. FIG. 2B is an illustration of a state in which the variable mechanism 200 decreases the flow-passage sectional area of the intake flow passage 101. FIG. 2A and FIG. 2B are extracted views of the broken-line portion of FIG. 1.

In the following, first, the structure of the narrowing portion 100A is described in detail. After that, the structure of the variable mechanism 200 is described in detail. The inner peripheral surface of the narrowing portion 100A has a radially contracted portion 100Aa, a main-flow-passage parallel portion 100Ab, and a radially expanded portion 100Ac.

The radially contracted portion 100Aa is reduced in inner diameter toward the compressor impeller 16 side. The radially contracted portion 100Aa forms an opening end of the auxiliary flow passage 104 on an inner peripheral side. The main-flow-passage parallel portion 100Ab is parallel to the axial direction. The main-flow-passage parallel portion 100Ab is continuous from the radially contracted portion 100Aa toward the compressor impeller 16 side. The radially expanded portion 100Ac is increased in inner diameter toward the compressor impeller 16 side. The radially expanded portion 100Ac is continuous from the main-flow-passage parallel portion 100Ab toward the compressor impeller 16 side.

The outer peripheral surface of the narrowing portion 100A has a slide portion 100Ad and an auxiliary-flow-passage curved surface portion 100Ae. The slide portion 100Ad is parallel to the axial direction. The auxiliary-flow-passage curved surface portion 100Ae is reduced in outer diameter toward the compressor impeller 16 side. The auxiliary-flow-passage curved surface portion 100Ae is continuous from the slide portion 100Ad toward the compressor impeller 16 side.

In this embodiment, the narrowing portion 100A includes a step portion 100Af between the slide portion 100Ad and the radially contracted portion 100Aa. The step portion 100Af includes an upper surface parallel to the axial direction and a side surface perpendicular to the axial direction. The upper surface of the step portion 100Af is continuous with the radially contracted portion 100Aa. The side surface of the step portion 100Af is continuous with the upper surface of the step portion 100Af and the slide portion 100Ad. However, the present disclosure is not limited to this configuration. It is not always required that the step portion 100Af be formed on the narrowing portion 100A. In such case, the slide portion 100Ad is continuous with the radially contracted portion 100Aa.

The inner peripheral surface of the cylindrical portion 100a has an auxiliary-flow-passage parallel portion 100b and an auxiliary-flow-passage curved surface portion 100c. The auxiliary-flow-passage parallel portion 100b is parallel to the axial direction. The auxiliary-flow-passage parallel portion 100b is opened at an end surface of the cylindrical portion 100a of the compressor housing 100. The auxiliary-flow-passage parallel portion 100b forms an opening end of the auxiliary flow passage 104 on an outer peripheral side. The auxiliary-flow-passage curved surface portion 100c is reduced in inner diameter toward the compressor impeller 16 side. The auxiliary-flow-passage curved surface portion 100c is continuous from the auxiliary-flow-passage parallel portion 100b toward the compressor impeller 16 side. An inner peripheral surface of the accommodating portion 100B is continuous from the auxiliary-flow-passage curved surface portion 100c toward the compressor impeller 16 side.

The auxiliary-flow-passage parallel portion 100b and the auxiliary-flow-passage curved surface portion 100c are located on the upstream side of the blades 16a of the compressor impeller 16. An outer diameter of a front edge 16b of the blades 16a of the compressor impeller 16 is smaller than an inner diameter of an opposing portion 100Ba, which is a part of the inner peripheral surface of the accommodating portion 100B and is opposed to the front edge 16b in a radial direction of the compressor impeller 16 (hereinafter simply referred to as "radial direction"). An inner diameter of the main-flow-passage parallel portion 100Ab is smaller than the inner diameter of the opposing portion 100Ba. The inner diameter of the main-flow-passage parallel portion 100Ab is smaller than the outer diameter of the front edge 16b of the blades 16a of the compressor impeller 16.

That is, a distance from a rotation center axis of the compressor impeller 16 to the main-flow-passage parallel portion 100Ab is smaller than a distance from the rotation center axis of the compressor impeller 16 to the opposing portion 100Ba. Moreover, a distance from the rotation center axis of the compressor impeller 16 to the main-flow-passage parallel portion 100Ab is smaller than a distance from the rotation center axis of the compressor impeller 16 to the front edge 16b.

It is not always required that the narrowing portion 100A have the main-flow-passage parallel portion 100Ab. For example, the narrowing portion 100A may have the radially contracted portion 100Aa and the radially expanded portion 100Ac formed continuous with each other. In that case, an inner diameter of a part of the narrowing portion 100A at which the radially contracted portion 100Aa and the radially expanded portion 100Ac are continuous with each other is smaller than the inner diameter of the opposing portion 100Ba. The inner diameter of the part of the narrowing portion 100A at which the radially contracted portion 100Aa and the radially expanded portion 100Ac are continuous with each other is smaller than the outer diameter of the front edge 16b.

The main flow passage 102 is formed of the radially contracted portion 100Aa, the main-flow-passage parallel portion 100Ab, and the radially expanded portion 100Ac. The flow-passage sectional area of the main flow passage 102 decreases from the upstream side toward the downstream side of the radially contracted portion 100Aa. The main flow passage 102 has the smallest flow-passage sectional area at the main-flow-passage parallel portion 100Ab. The main flow passage 102 includes a narrowed flow passage 102a having a diameter smaller than that of the front edge 16b of the blades 16a of the compressor impeller 16.

In other words, the main flow passage 102 has a minimum inner diameter smaller than the outer diameter of the front edge 16b of the blades 16a of the compressor impeller 16.

However, it is not always required that the narrowing portion 100A have the radially contracted portion 100Aa and the radially expanded portion 100Ac. For example, the inner peripheral surface of the narrowing portion 100A may have only the main-flow-passage parallel portion 100Ab. Moreover, the inner diameter of the main-flow-passage parallel portion 100Ab may be equal to or larger than the outer diameter of the front edge 16b of the blades 16a of the compressor impeller 16. In other words, the minimum inner diameter of the main flow passage 102 may be equal to or larger than the outer diameter of the front edge 16b of the blades 16a of the compressor impeller 16.

The auxiliary flow passage 104 is formed of the slide portion 100Ad, the auxiliary-flow-passage curved surface portion 100Ae, the auxiliary-flow-passage parallel portion 100b, and the auxiliary-flow-passage curved surface portion 100c. The auxiliary flow passage 104 is formed on the radially outer side (outer diameter side) with respect to the main flow passage 102. The auxiliary flow passage 104 has one end communicating to the main flow passage 102 and has another end communicating to the main flow passage 102 at a position more apart from the compressor impeller 16 than the one end. Specifically, the one end of the auxiliary flow passage 104 communicates to the main flow passage 102 more on the compressor impeller 16 side (downstream side) than the narrowed flow passage 102a. The another end of the auxiliary flow passage 104 communicates to the main flow passage 102 on the side farther apart from the compressor impeller 16 (upstream side) than the narrowed flow passage 102a.

The auxiliary flow passage 104 includes a parallel flow passage portion 104a and an inclined flow passage portion 104b. The parallel flow passage portion 104a is formed between the slide portion 100Ad and the auxiliary-flow-passage parallel portion 100b. The inclined flow passage portion 104b is formed between the auxiliary-flow-passage curved surface portion 100Ae and the auxiliary-flow-passage curved surface portion 100c.

The inclined flow passage portion 104b is inclined toward the radially inner side as extending from the upstream side toward the downstream side. In this embodiment, a sectional shape of the inclined flow passage portion 104b in a cross section including the rotation center axis of the compressor impeller 16 is curved. That is, the auxiliary-flow-passage curved surface portion 100Ae and the auxiliary-flow-passage curved surface portion 100c each have a curved surface shape. Specifically, the auxiliary-flow-passage curved surface portion 100Ae and the auxiliary-flow-passage curved surface portion 100c each have a spherical surface shape.

A curvature center of the auxiliary-flow-passage curved surface portion 100Ae is located more on the radially inner side than the auxiliary-flow-passage curved surface portion 100Ae. A curvature center of the auxiliary-flow-passage curved surface portion 100c is located more on the radially inner side than the auxiliary-flow-passage curved surface portion 100c.

However, the curvature center of the auxiliary-flow-passage curved surface portion 100Ae may be located more on the radially outer side than the auxiliary-flow-passage curved surface portion 100Ae. The curvature center of the auxiliary-flow-passage curved surface portion 100c may be located more on the radially outer side than the auxiliary-flow-passage curved surface portion 100c.

Moreover, the sectional shape of the auxiliary-flow-passage curved surface portion 100Ae in the cross section including the rotation center axis of the compressor impeller 16 may be, for example, a non-spherical surface shape or a straight-line shape. The sectional shape of the auxiliary-flow-passage curved surface portion 100c in the cross section including the rotation center axis of the compressor impeller 16 may be, for example, a non-spherical shape or a straight-line shape.

Next, the structure of the variable mechanism 200 is described in detail. The variable mechanism 200 includes a blocking plate (movable member) 202, a link mechanism 204, and a linear actuator 206. The link mechanism 204 and the linear actuator 206 are arranged on an outer peripheral surface of the cylindrical portion 100a. The link mechanism 204 and the linear actuator 206 are provided at one position in the circumferential direction of the cylindrical portion 100a. However, a plurality of sets of the link mechanism 204 and the linear actuator 206 may be provided in the circumferential direction of the cylindrical portion 100a.

The blocking plate 202 is provided in the auxiliary flow passage 104. The blocking plate 202 is placed on the slide portion 100Ad of the narrowing portion 100A. The blocking plate 202 is configured to be slidable on the slide portion 100Ad in the rotation axis direction of the compressor impeller 16. The blocking plate 202 is configured to be movable between a first position at which an opening degree of the auxiliary flow passage 104 becomes a first opening degree and a second position at which the opening degree of the auxiliary flow passage 104 becomes a second opening degree smaller than the first opening degree.

Specifically, the blocking plate 202 is configured to be movable to the position illustrated in FIG. 2A (first position) at which the opening degree of the auxiliary flow passage 104 becomes a full-open degree. Moreover, the blocking plate 202 is configured to be movable to the position illustrated in FIG. 2B (second position) at which the opening degree of the auxiliary flow passage 104 becomes a full-close degree. However, it is not always required that the opening degree of the auxiliary flow passage 104 become the full-close degree when the blocking plate 202 moves to the position illustrated in FIG. 2B. It is only required that the opening degree of the auxiliary flow passage 104 become an opening degree smaller than the full-open degree when the blocking plate 202 moves to the position illustrated in FIG. 2B.

The blocking plate 202 includes an engagement portion 202a and an opening/closing portion 202b. The engagement portion 202a is engaged with a protrusion portion 204e of the link mechanism 204 described later. The engagement portion 202a is formed on an outer peripheral surface of the opening/closing portion 202b. The engagement portion 202a protrudes from a part of the outer peripheral surface of the opening/closing portion 202b toward the radially outer side. The engagement portion 202a has a bottomed cylindrical shape. The engagement portion 202a has a recess portion 202c which is opened on the radially outer side.

The opening/closing portion 202b has a cylindrical shape having an opening in the axial direction. An inner peripheral surface of the opening/closing portion 202b is brought into abutment against the slide portion 100Ad. The opening/closing portion 202b is slidable on the slide portion 100Ad in the axial direction. The slide portion 100Ad is configured to guide the opening/closing portion 202b in the axial direction. The outer peripheral surface of the opening/closing portion 202b is flush with the upper surface of the step portion 100Af. However, it is not always required that the outer peripheral surface of the opening/closing portion 202b be flush with the upper surface of the step portion 100Af.

A length of the opening/closing portion 202b in the axial direction is approximately equal to a length of the slide portion 100Ad in the axial direction. When the opening/closing portion 202b is at the position illustrated in FIG. 2A, an end portion of the opening/closing portion 202b on the compressor impeller 16 side does not protrude from the slide portion 100Ad toward the auxiliary-flow-passage curved surface portion 100Ae. When the opening/closing portion 202b is at the position illustrated in FIG. 2B, the end portion of the opening/closing portion 202b on the compressor impeller 16 side protrudes from the slide portion 100Ad toward the auxiliary-flow-passage curved surface portion 100Ae side.

The link mechanism 204 includes a case member 204a, a pin (rotation shaft) 204b, a link (link member) 204c, and a knuckle joint 204d. The case member 204a accommodates the pin 204b, the link 204c, and the knuckle joint 204d.

The case member 204a is mounted to the outer peripheral surface of the cylindrical portion 100a. The case member 204a has a hollow portion formed inside thereof. The case member 204a has a bottom surface connected to the outer peripheral surface of the cylindrical portion 100a. The case member 204a has a bottom-surface opening, which is formed in the bottom surface and communicates to the hollow portion. The case member 204a has a side surface connected to the linear actuator 206. The case member 204a has a side-surface opening, which is formed in the side surface and communicates to the hollow portion.

The cylindrical portion 100a has a through hole 100e passing therethrough in the radial direction. The through hole 100e is formed at one position in the circumferential direction of the cylindrical portion 100a. However, a plurality of through holes 100e may be formed in the circumferential direction of the cylindrical portion 100a. The bottom surface of the case member 204a is connected to an outer peripheral edge of the through hole 100e. The outer peripheral edge of the through hole 100e is covered with the case member 204a. The through hole 100e communicates to the hollow portion through the bottom-surface opening of the case member 204a.

Here, the linear actuator 206 is connected to the side-surface opening of the case member 204a. The side-surface opening of the case member 204a is covered with the linear actuator 206. Thus, the hollow portion of the case member 204a is tightly closed by the linear actuator 206.

The pin 204b has a circular column shape. The pin 204b extends in a direction orthogonal to a moving direction of the blocking plate 202 (that is, the axial direction) and the radial direction. Both ends of the pin 204b are mounted to the case member 204a.

The link 204c has a flat plate shape. The link 204c has a through hole and an elongated hole. The through hole of the link 204c is engaged with the pin 204b. The link 204c is configured to be rotatable about a center axis of the pin 204b (about a predetermined rotation axis). The link 204c has the protrusion portion (engagement member) 204e at a distal end thereof. The protrusion portion 204e is inserted into the recess portion 202c of the engagement portion 202a. The protrusion portion 204e is engaged with (brought into contact with) an inner peripheral surface of the recess portion 202c.

The protrusion portion 204e is a circular columnar member having a semispherical shape at a distal end thereof. The protrusion portion 204e is provided separately from the link 204c. The protrusion portion 204e is inserted into a fitting portion of the link 204c to be fitted to the link 204c. However, the protrusion portion 204e may be formed integrally with the link 204c.

A length (total length) of the protrusion portion 204e in the center axis direction is smaller than a depth of the recess portion 202c. An outer diameter of the protrusion portion 204e is smaller than an inner diameter of the recess portion 202c. As illustrated in FIG. 2A, the protrusion portion 204e is brought into contact with the inner peripheral surface of the recess portion 202c on the upstream side in the axial direction (right side of FIG. 2A). At this time, the protrusion portion 204e is in non-contact with the inner peripheral surface of the recess portion 202c on the downstream side (left side of FIG. 2A). That is, the protrusion portion 204e and the recess portion 202c have a clearance in the axial direction.

Moreover, as illustrated in FIG. 2A, the protrusion portion 204e is in non-contact with the bottom surface of the recess portion 202c. That is, the protrusion portion 204e and the recess portion 202c have a clearance in the radial direction.

As illustrated in FIG. 2B, the protrusion portion 204e is brought into contact with the inner peripheral surface of the recess portion 202c on the downstream side in the axial direction (left side of FIG. 2B). At this time, the protrusion portion 204e is in non-contact with the inner peripheral surface of the recess portion 202c on the upstream side (right side of FIG. 2B). That is, the protrusion portion 204e and the recess portion 202c have a clearance in the axial direction.

Moreover, as illustrated in FIG. 2B, the protrusion portion 204e is in non-contact with the bottom surface of the recess portion 202c. That is, the protrusion portion 204e and the recess portion 202c have a clearance in the radial direction.

The protrusion portion 204e has a clearance with respect to the engagement portion 202a (inner peripheral surface of the recess portion 202c) during the movement between the position illustrated in FIG. 2A and the position illustrated in FIG. 2B. This clearance is provided in each of the axial direction, the radial direction, and the rotation direction (circumferential direction) of the compressor impeller 16. With the clearance provided between the protrusion portion 204e and the recess portion 202c, the opening/closing portion 202b becomes less liable to be held onto the slide portion 100Ad.

The elongated hole of the link 204c is formed on a side opposite to the protrusion portion 204e over the through hole. A length of the elongated hole of the link 204c in a longitudinal direction of the link 204c is larger than a length in a transverse direction of the link 204c. The knuckle joint 204d includes a shaft portion which extends in parallel with the center axis of the pin 204b. The shaft portion is inserted through the elongated hole of the link 204c. With this, the elongated hole of the link 204c is engaged with the shaft portion of the knuckle joint 204d. The knuckle joint 204d includes a fitting portion into which one end of a rod 206f of the linear actuator 206 described later is inserted.

A driven portion (that is, the elongated hole) driven by the linear actuator 206 and a drive portion (that is, the protrusion portion 204e fitted to the fitting portion) configured to drive the blocking plate 202 are provided to the link 204c. The driven portion of the link 204c is provided on one end side with respect to the pin 204b, and the drive portion is provided on another end side with respect to the pin 204b.

The knuckle joint 204d is driven by the linear actuator 206 between the position illustrated in FIG. 2A and the position illustrated in FIG. 2B. When the knuckle joint 204d is driven, the link 204c rotates about the pin 204b between the position illustrated in FIG. 2A and the position illustrated in FIG. 2B. When the link 204c rotates, the blocking plate 202 is driven by the protrusion portion 204e between the position illustrated in FIG. 2A and the position illustrated in FIG. 2B.

A distance from the pin 204b to the distal end of the protrusion portion 204e (drive portion) is larger than a distance from the pin 204b to the elongated hole (driven portion). A distance between a contact position, at which the protrusion portion 204e is brought into contact with the recess portion 202c, and the pin 204b is larger than a distance between an engagement position, at which the elongated hole of the link 204c is engaged with the knuckle joint 204d, and the pin 204b. Therefore, the link 204c is capable of setting a movement amount of the blocking plate 202 to be larger than a movement amount of the knuckle joint 204d.

The linear actuator 206 is, for example, a linear solenoid. In this embodiment, the linear actuator 206 is configured as a linear solenoid of a two-way self-holding type. With the use of the linear solenoid, the responsiveness can be set faster as compared to a case of using, for example, a rotary solenoid or a motor.

The linear actuator 206 includes a housing 206a, a pair of coils 206b and 206c, a permanent magnet 206d, a plunger 206e, and the rod 206f. The linear actuator 206 is configured to drive the rod 206f between the position illustrated in FIG. 2A and the position illustrated in FIG. 2B. The linear actuator 206 drives the rod 206f to drive the blocking plate 202 between the position illustrated in FIG. 2A (first position) and the position illustrated in FIG. 2B (second position).

The housing 206a accommodates the pair of coils 206b and 206c, the permanent magnet 206d, the plunger 206e, and a part of the rod 206f. The pair of coils 206b and 206c are connected in series. The pair of coils 206b and 206c are arranged apart from each other in the center axis direction of the linear actuator 206. The permanent magnet 206d is arranged between the pair of coils 206b and 206c. The pair of coils 206b and 206c and the permanent magnet 206d each have an annular shape.

The plunger 206e is arranged on an inner diameter side of the pair of coils 206b and 206c and the permanent magnet 206d. The plunger 206e is opposed to the pair of coils 206b and 206c and the permanent magnet 206d in a direction orthogonal to the center axis of the linear actuator 206.

The rod 206f is arranged on a center axis of the plunger 206e. The rod 206f is fitted to the plunger 206e. The rod 206f moves integrally with the plunger 206e. Both ends of the rod 206f protrude from the housing 206a. One end of the rod 206f enters the hollow portion of the case member 204a through the side-surface opening of the case member 204a. The one end of the rod 206f is fitted to the fitting portion of the knuckle joint 204d.

When a current is applied to flow through the pair of coils 206b and 206c, the plunger 206e moves inside the housing 206a in the center axis direction of the linear actuator 206. In this embodiment, the center axis direction of the linear actuator 206 aligns with the center axis direction of the compressor impeller 16. For example, when the current is applied to flow through the pair of coils 206b and 206c in a first direction, the plunger 206e moves from one end side (position illustrated in FIG. 2A) toward another end side (position illustrated in FIG. 2B) inside the housing 206a.

The plunger 206e, the rod 206f, and the knuckle joint 204d integrally move from the position illustrated in FIG. 2A to the position illustrated in FIG. 2B. When the knuckle joint 204d moves, the link 204c rotates about the pin 204b from the position illustrated in FIG. 2A to the position illustrated in FIG. 2B. When the link 204c rotates, the protrusion portion 204e causes the blocking plate 202 to move from the position illustrated in FIG. 2A to the position illustrated in FIG. 2B.

At this time, when the current flowing through the pair of coils 206b and 206c is stopped, the plunger 206e is held on another end side (position illustrated in FIG. 2B) by an attraction force of the permanent magnet 206d. As a result, the blocking plate 202 is held at the position illustrated in FIG. 2B.

Moreover, when the current is applied to flow through the pair of coils 206b and 206c in a second direction opposite to the first direction, the plunger 206e moves from the another end side (position illustrated in FIG. 2B) toward the one end side (position illustrated in FIG. 2A) inside the housing 206a.

The plunger 206e, the rod 206f, and the knuckle joint 204d integrally move from the position illustrated in FIG. 2B to the position illustrated in FIG. 2A. When the knuckle joint 204d moves, the link 204c rotates about the pin 204b from the position illustrated in FIG. 2B to the position illustrated in FIG. 2A. When the link 204c rotates, the protrusion portion 204e causes the blocking plate 202 to move from the position illustrated in FIG. 2B to the position illustrated in FIG. 2A.

At this time, when the current flowing through the pair of coils 206b and 206c is stopped, the plunger 206e is held on the one end side (position illustrated in FIG. 2A) by the attraction force of the permanent magnet 206d. As a result, the blocking plate 202 is held at the position illustrated in FIG. 2A.

When the blocking plate 202 is held at the position illustrated in FIG. 2A, the opening/closing portion 202b is held at an opening position of opening the auxiliary flow passage 104 (opened state). At this time, the opening/closing portion 202b is brought into abutment against the step portion 100Af. Meanwhile, when the blocking plate 202 is held at the position illustrated in FIG. 2B, the opening/closing portion 202b is held at a closing position of closing the auxiliary flow passage 104 (closed state). At this time, the opening/closing portion 202b is apart from the step portion 100Af on the compressor impeller 16 side.

The linear actuator 206 moves the blocking plate 202 in the axial direction with use of the link mechanism 204. The auxiliary flow passage 104 is changed to the opened state or the closed state by the movement of the blocking plate 202 in the axial direction.

As described above, the variable mechanism 200 is configured to be capable of opening and closing the auxiliary flow passage 104. The variable mechanism 200 brings the auxiliary flow passage 104 into the closed state under the operation condition of the turbocharger C on the small flow rate side. When the auxiliary flow passage 104 is brought into the closed state, the accommodating portion 100B communicates only to the main flow passage 102 without communicating to the auxiliary flow passage 104. When the auxiliary flow passage 104 is brought into the closed state, a diameter (effective sectional area) of the flow passage (intake flow passage 101) communicating to the accommodating portion 100B becomes smaller. When the diameter of the flow passage communicating to the accommodating portion 100B becomes smaller, the operation region of the turbocharger C on the small flow rate side increases.

However, when the auxiliary flow passage 104 is brought into the closed state, the amount of air that flows into the compressor impeller 16 is reduced. When the amount of air that flows into the compressor impeller 16 is reduced, the operation region of the turbocharger C on the large flow rate side decreases. The variable mechanism 200 brings the auxiliary flow passage 104 into the opened state under the operation condition of the turbocharger C on the large flow rate side. When the auxiliary flow passage 104 is brought into the opened state, the accommodating portion 100B communicates to both of the main flow passage 102 and the auxiliary flow passage 104. The air flows into the compressor impeller 16 through both of the main flow passage 102 and the auxiliary flow passage 104. That is, the amount of air that flows into the compressor impeller 16 becomes larger as compared to the case in which the auxiliary flow passage 104 is in the closed state. When the amount of air that flows into the compressor impeller 16 increases, the decrease amount of the operation region of the turbocharger C on the large flow rate side is reduced. In other words, when the amount of air that flows into the compressor impeller 16 increases, the operation region of the turbocharger C on the large flow rate side can be maintained.

According to this embodiment, when the auxiliary flow passage 104 is brought into the closed state, the variable mechanism 200 can shift a limit flow rate that causes surging to the small flow rate side. When the auxiliary flow passage 104 is brought into the opened state, the variable mechanism 200 can maintain a limit flow rate that causes choking.

Through the driving of the blocking plate 202 with use of the linear actuator 206, the variable mechanism 200 can be downsized as compared to the case in which the blocking plate 202 is driven by the rotary actuator. Moreover, in this embodiment, the through hole 100e and the link mechanism 204 are provided at one position in the circumferential direction of the cylindrical portion 100a. Thus, the variable mechanism 200 can be downsized as compared to the case in which a plurality of sets of the through hole 100e and the link mechanism 204 are provided in the circumferential direction of the cylindrical portion 100a. Moreover, a configuration of the variable mechanism 200 can be simplified as compared to the case in which a plurality of sets of the through hole 100e and the link mechanism 204 are provided in the circumferential direction of the cylindrical portion 100a. Therefore, cost for the variable mechanism 200 can be reduced. That is, the variable mechanism 200 is capable of opening and closing the auxiliary flow passage 104 with a simple configuration.

The one embodiment of the present disclosure has been described above with reference to the attached drawings, but, needless to say, the present disclosure is not limited to the embodiment. It is apparent that those skilled in the art may arrive at various alternations and modifications within the scope of claims, and those examples are construed as naturally falling within the technical scope of the present disclosure.

In the embodiment described above, description has been made of the example in which both ends of the auxiliary flow passage 104 communicate to the main flow passage 102. However, the present disclosure is not limited to this example. At least one of the both ends of the auxiliary flow passage 104 is not required to communicate to the main flow passage 102. For example, the auxiliary flow passage 104 may be provided more on the outer diameter side than the main flow passage 102, and may be provided independently from the main flow passage 102.

In the embodiment described above, description has been made of the example in which the linear actuator 206 is the linear solenoid including the permanent magnet 206d. However, the present disclosure is not limited to this example. The linear actuator 206 may be a linear solenoid which does not include the permanent magnet 206d. Moreover, the linear actuator 206 is not limited to the linear solenoid, and may be a linear motor or a pneumatic actuator.

In the embodiment described above, description has been made of the example in which the variable mechanism 200 is configured to move the blocking plate 202 between the first position illustrated in FIG. 2A and the second position illustrated in FIG. 2B. However, the present disclosure is not limited to this example. The variable mechanism 200 may be configured to move the blocking plate 202 also to an intermediate position (third position) between the position illustrated in FIG. 2A and the position illustrated in FIG. 2B.

In the embodiment described above, description has been made of the example in which the linear actuator 206 is configured to drive the blocking plate 202 with use of the link mechanism 204. However, the present disclosure is not limited to this example. The linear actuator 206 may be configured to drive the blocking plate 202 without use of the link mechanism 204. For example, the engagement portion 202a of the blocking plate 202 may be directly connected to the rod 206f of the linear actuator 206. When the rod 206f and the engagement portion 202a are connected to each other, the linear actuator 206 directly drives the blocking plate 202.

In the embodiment described above, description has been made of the example in which the variable mechanism 200 is configured to move the blocking plate 202 in the axial direction. However, the present disclosure is not limited to this example. The variable mechanism 200 may be configured to move the narrowing portion 100A in the axial direction. For example, the engagement portion 202a may be formed on the narrowing portion 100A. The engagement portion 202a formed on the narrowing portion 100A may be engaged with the protrusion portion 204e of the link mechanism 204. Moreover, the link mechanism 204 may be driven by the linear actuator 206. As described above, the narrowing portion 100A may be configured as a movable member driven by the linear actuator 206.

INDUSTRIAL APPLICABILITY

The present disclosure can be used for a centrifugal compressor.

What is claimed is:
1. A centrifugal compressor, comprising:
an impeller;
a main flow passage formed on a front surface side of the impeller;
a movable member which is movable between a first position and a second position, the first position being a position at which an opening degree of an auxiliary flow passage arranged more on an outer diameter side than the main flow passage becomes a first opening degree, the second position being a position at which an opening degree of the auxiliary flow passage becomes a second opening degree smaller than the first opening degree; and
a linear actuator configured to drive the movable member in a rotation axis direction of the impeller;
a link member rotatable around a center axis of a pin, the link member including:
a driven portion configured to be driven by the linear actuator, and
a fitting portion arranged opposite to the driven portion across the center axis;

an engagement member provided to the fitting portion; and an engagement portion provided to the movable member and including a recess portion engaging with the engagement member, wherein the engagement member and the recess portion have a clearance therebetween in each of an axial direction, a radial direction, and a circumferential direction of the impeller, and a distance from the pin to a distal end of the engagement member is larger than a distance from the pin to the driven portion.

2. The centrifugal compressor according to claim 1, wherein the linear actuator comprises a linear solenoid including a permanent magnet.

3. The centrifugal compressor according to claim 1, further comprising a wall portion configured to define the main flow passage and the auxiliary flow passage, wherein the movable member comprises a blocking plate, which is provided in the auxiliary flow passage, and is slidable in a rotation axis direction of the impeller along the wall portion.

4. The centrifugal compressor according to claim 2, further comprising a wall portion configured to define the main flow passage and the auxiliary flow passage, wherein the movable member comprises a blocking plate, which is provided in the auxiliary flow passage, and is slidable in a rotation axis direction of the impeller along the wall portion.

\* \* \* \* \*